United States Patent

Baralle

[11] Patent Number: 5,111,856
[45] Date of Patent: May 12, 1992

[54] TANK HAVING A SHELL CAPILLARY EFFECT

[75] Inventor: Denis L. Baralle, Vernon, France

[73] Assignee: Societe Europeenne de Propulsion, Suresnes, France

[21] Appl. No.: 627,698

[22] Filed: Dec. 14, 1990

[30] Foreign Application Priority Data

Dec. 19, 1989 [FR] France ................. 89 16829

[51] Int. Cl.[5] ............... B65B 3/04; B65B 1/04
[52] U.S. Cl. ..................... 141/230; 141/31; 141/65; 137/574; 222/394; 220/566; 220/500; 220/4.12
[58] Field of Search ............ 141/31, 34, 65, 230; 222/420, 143, 394; 137/574, 576; 220/566, 500, 502, 4.12, 4.14, 4.15

[56] References Cited

U.S. PATENT DOCUMENTS

| | | | |
|---|---|---|---|
| 1,143,646 | 6/1915 | Poor | 137/574 |
| 3,486,302 | 12/1969 | Paynter | 55/159 |
| 4,168,718 | 9/1979 | Hess et al. | 137/574 |
| 4,335,746 | 6/1982 | Miyahara et al. | 137/576 |
| 4,397,408 | 8/1983 | Robert | 222/394 |
| 4,489,745 | 12/1984 | Netter et al. | 137/574 |
| 4,615,452 | 10/1986 | Lederer et al. | 220/566 |
| 4,715,399 | 12/1987 | Jaeckle, Jr. et al. | 137/574 |
| 4,790,472 | 12/1988 | Bunkoczy | 220/566 |

FOREIGN PATENT DOCUMENTS

0132175  1/1985  European Pat. Off.

Primary Examiner—Henry J. Recla
Assistant Examiner—Keith Kupferschmid
Attorney, Agent, or Firm—Weingarten, Schurgin, Gagnebin & Hayes

[57] ABSTRACT

A liquid and gas tank is provided for operation, in particular, in satellites subject to low acceleration, that utilizes a separation force produced by surface tension to collect liquid in a privileged zone of the tank without allowing gas to escape via the privileged zone. The tank includes an outer first shell element having a curvilinear shape, and having at one end a surface portion S of radius of curvature r which is concave on a side that contacts liquid. The tank also includes an inner second shell element fixed to the first element, being convex in shape on a side that contacts liquid, and curvilinear in shape and including a surface portion S' having a part which is slightly inclined relative to the surface portion S in the privileged zone forming a narrowest zone between the surface portions S and S', the surface portion S' having a radius of curvature r' which is less than the radius of curvature r, wherein liquid is urged into the narrowest zone due to a capillary effect. The tank further includes at least one liquid drawing-off element opening out into the narrowest zone lying between the surface portions S and S'.

17 Claims, 6 Drawing Sheets

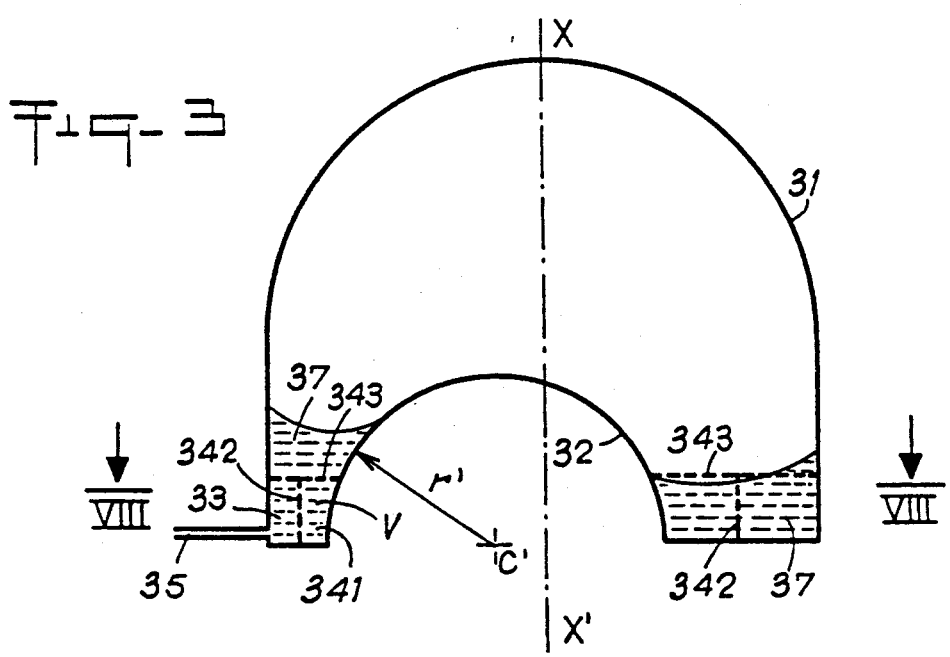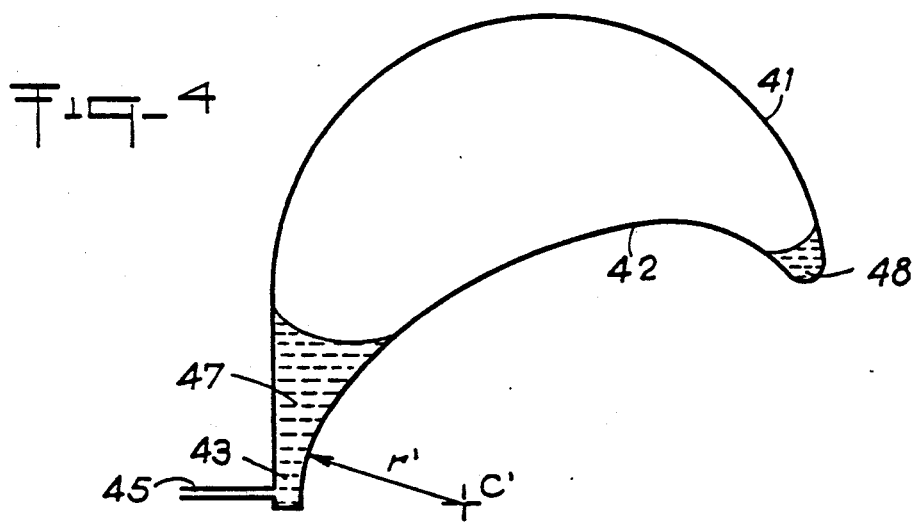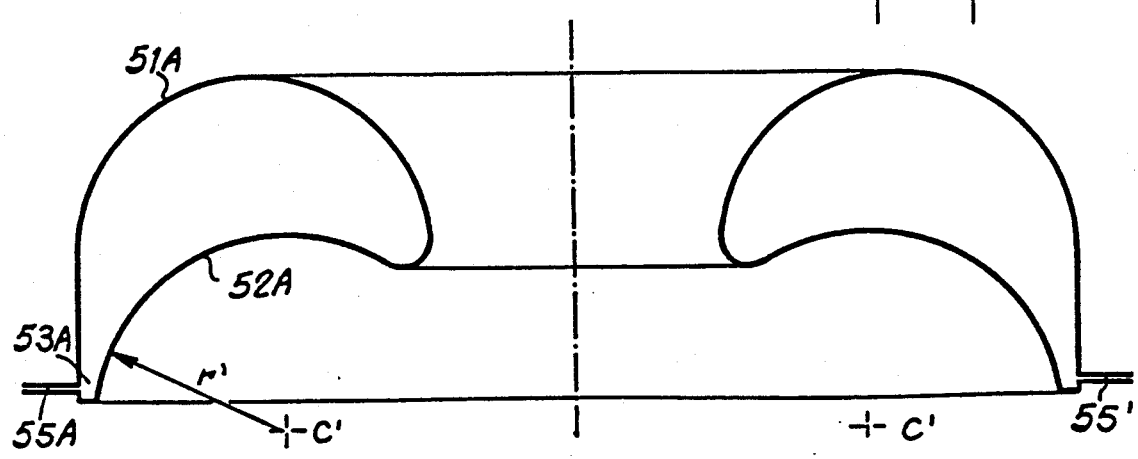

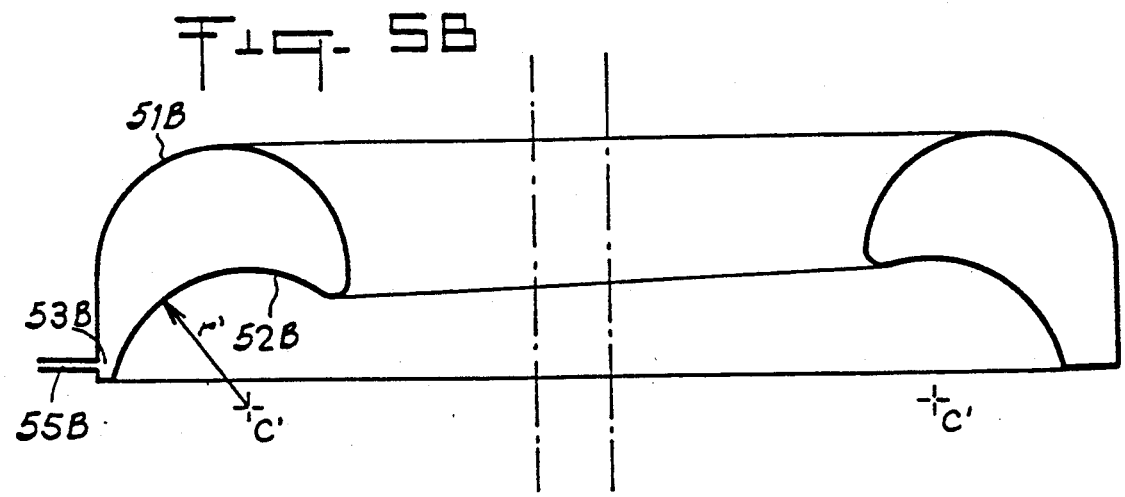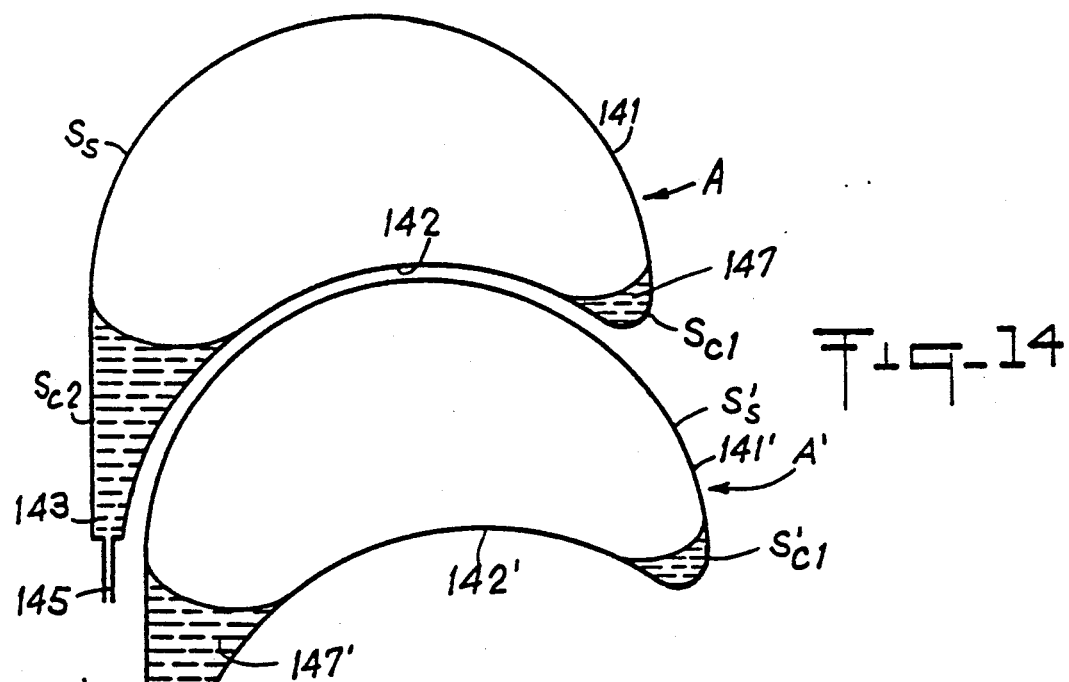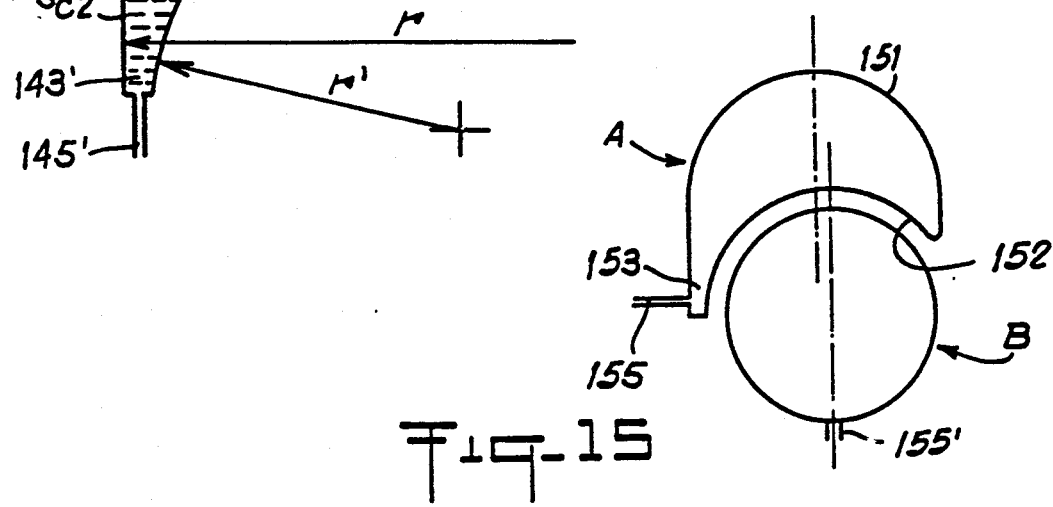

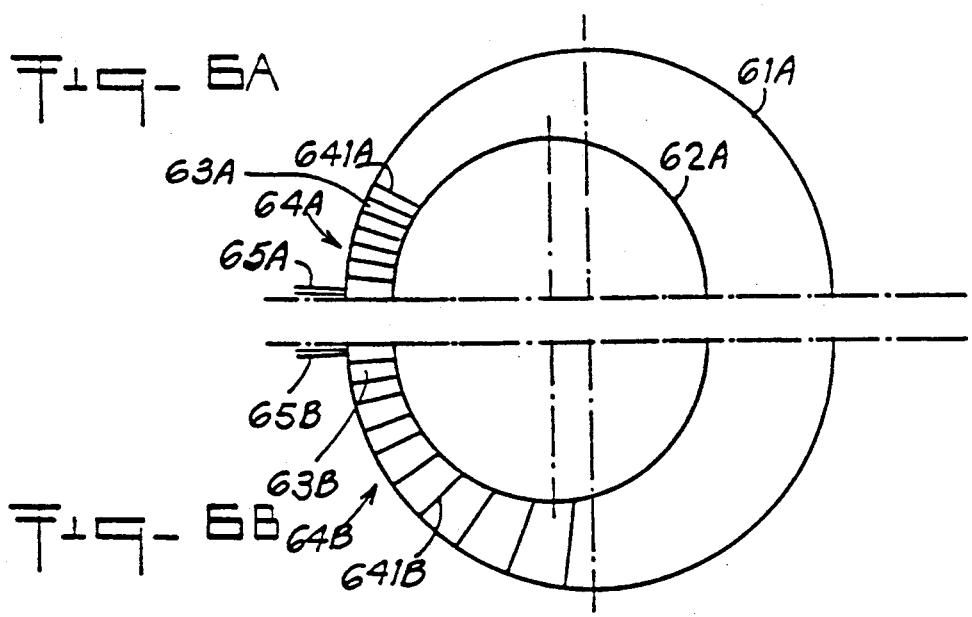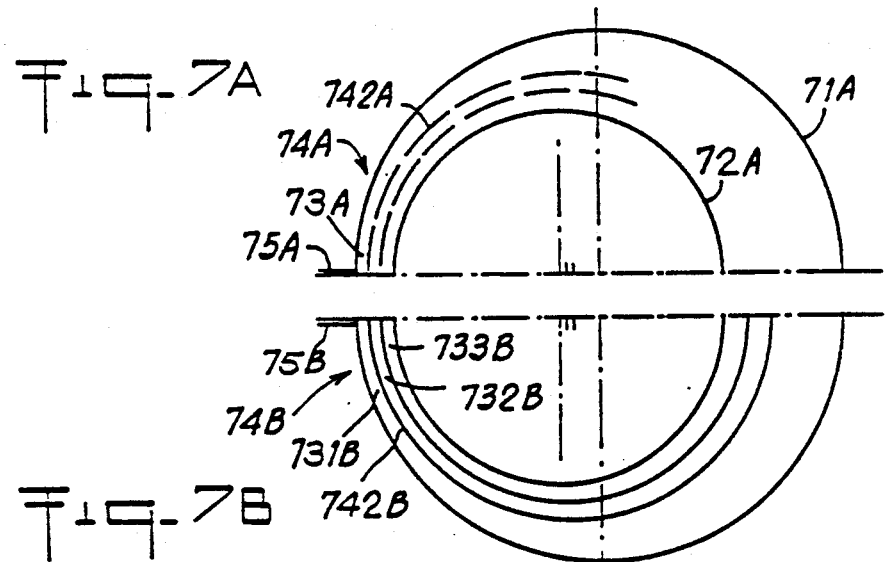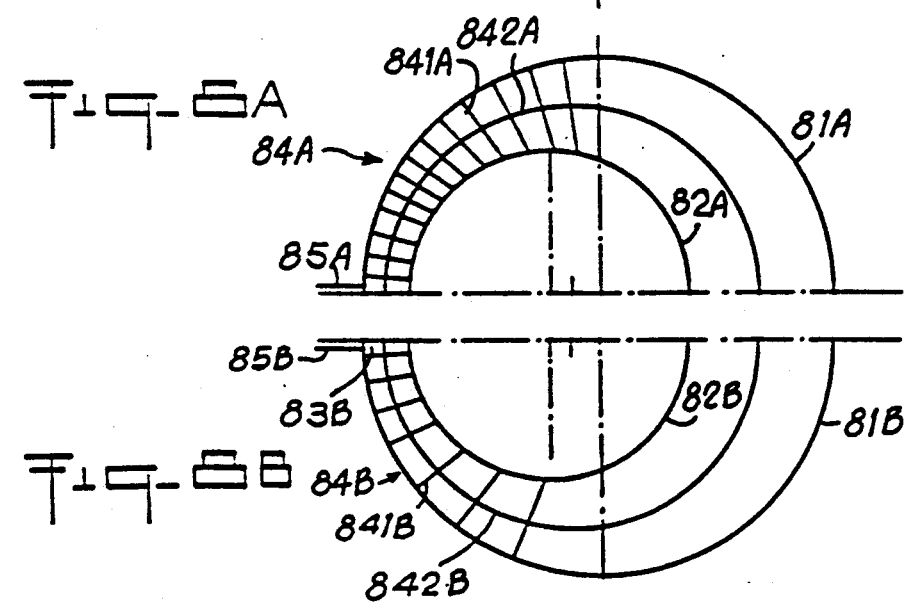

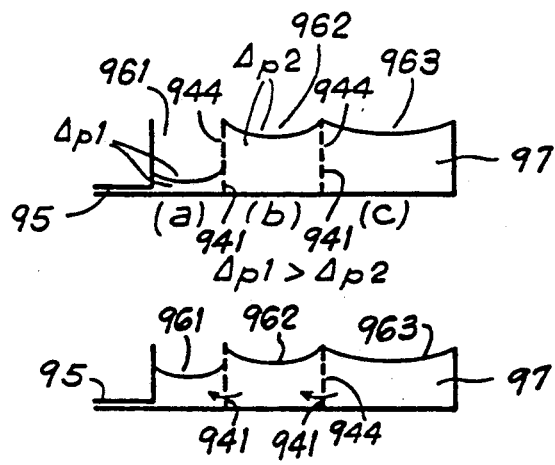
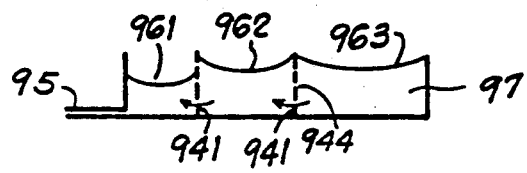
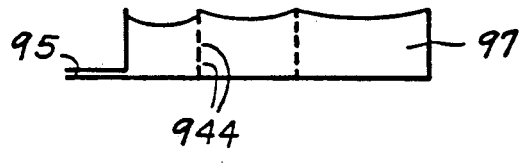
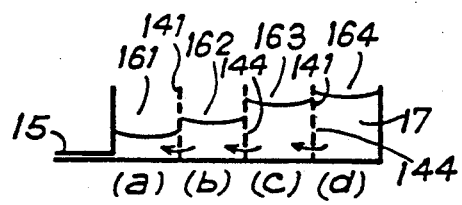
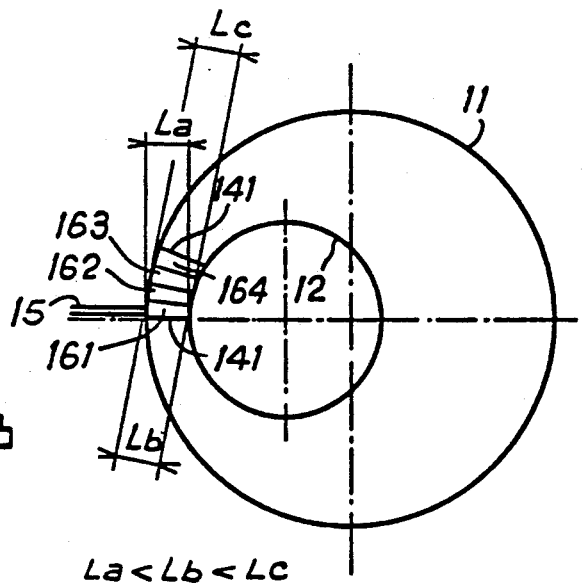

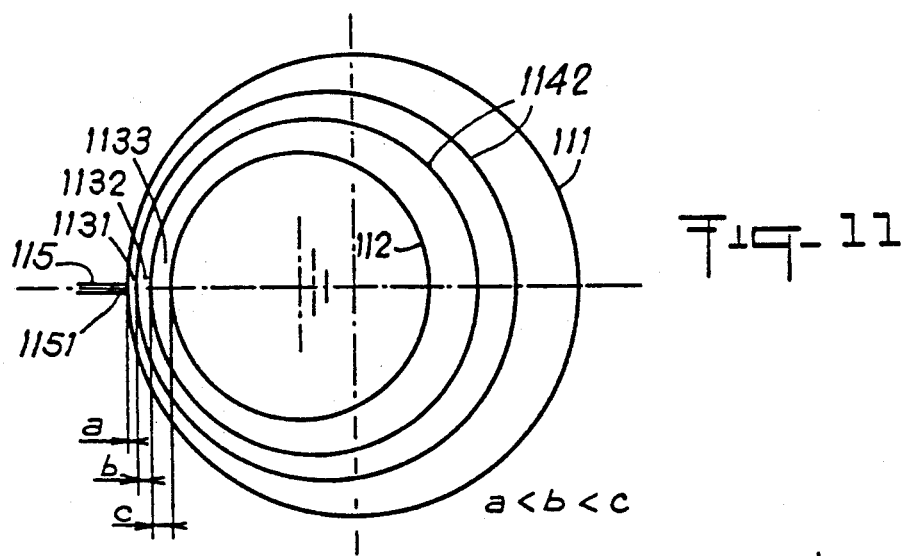
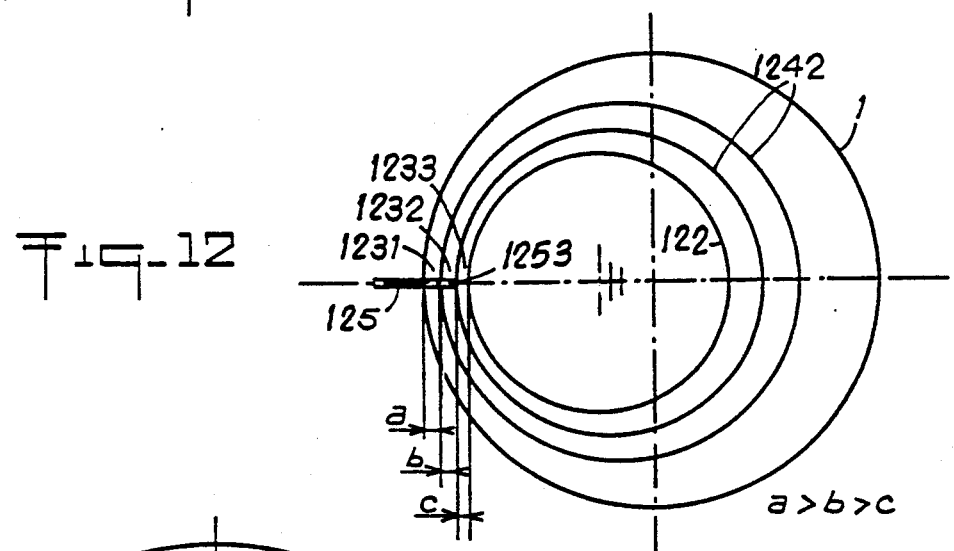
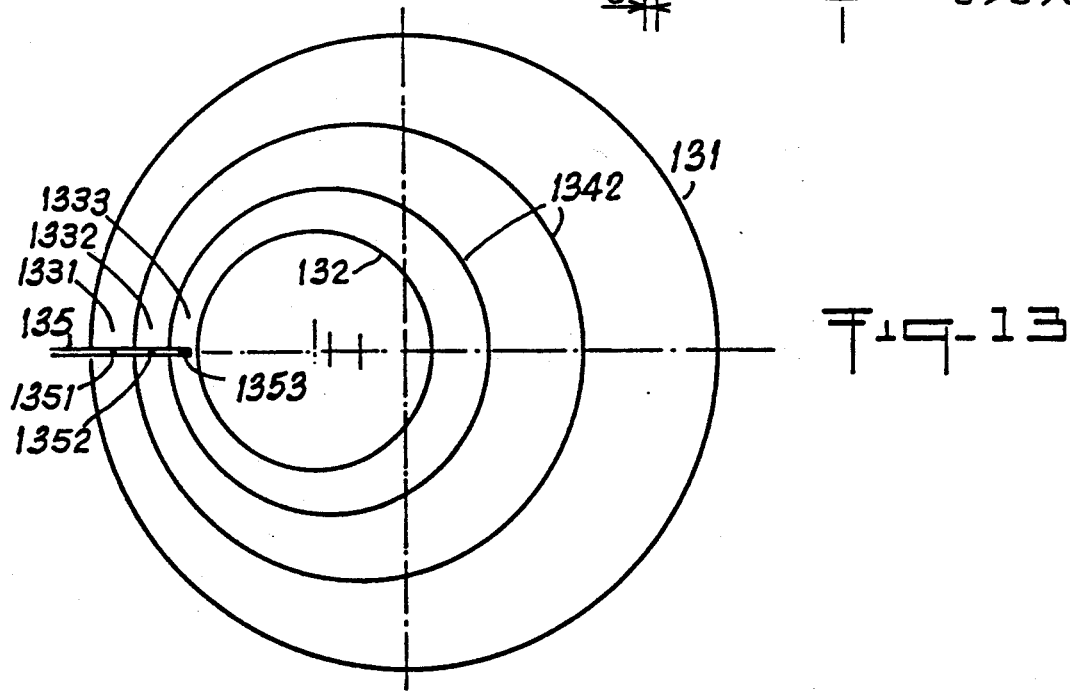

TANK HAVING A SHELL CAPILLARY EFFECT

The present invention relates to a tank for liquid and gas and is intended for operation, in particular, in satellites that are subject to low acceleration. Use is made of the separation force produced by surface tension to collect the liquid in a privileged zone of the tank without allowing gas to escape via said zone.

BACKGROUND OF THE INVENTION

Localizing liquids and confining them are two functions that are very important for tanks that operate in weightlessness where accelerations are minimal.

At present, tanks of this type are fitted on the inside with special collector devices designed to retain and draw off liquids.

French patent application FR 2 484 961 relates to a surface tension tank fitted with such a collector device. Naturally, the collector device described in that document enables liquids to be localized close to the liquid outlet provided in a spherical tank. To do this, channels extend along meridian planes at a small distance from the inside wall of the tank, and they terminate at one end in a collecting chamber situated in the immediate proximity of the liquid outlet orifice. Various gas barriers (e.g. metal gauzes) are provided in the collecting chamber and for the surfaces of the channels facing the inside wall of the tank.

Another special collector device is described in French patent application No. 2 486 624. In that document, the inside of a spherical tank is lined with a plurality of feed laminations which are situated at a small distance from the inside wall of the tank and which terminate at a cylindrical liquid-outlet device. This device is constituted by a two-fold laminated structure having internal laminations extending radially and external laminations extending annularly, with the assembly delimiting a central passage that is coaxial with the liquid outlet orifice.

In simpler manner, U.S. Pat. No. 3,486,302 describes a storage tank enclosing a gas-liquid separator screen situated at a certain distance from the inside wall close to the vapor outlet, and at a very small distance from the liquid outlet.

Another example of a partitioning device is illustrated by French patent application No. FR-2 283 390. That document shows a multiple partitioning system situated inside the tank with partitions in a fan-like disposition. A duct for drawing off the liquid is provided close to the "base" of the fan. In all of the above-mentioned examples, the drawing-off function is thus provided by a special device contained inside the tank with the shape of the tank being preferably spherical.

SUMMARY OF THE INVENTION

The present invention seeks to provide a tank of simpler design which is capable of collecting liquids, particularly in weightlessness, or a tank having improved operational limits.

A particular aim of the invention is to facilitate tank installation in a vehicle such as a satellite, by making it possible to adopt a very wide variety of outside shapes, while simplifying manufacture essentially by using assemblies made up of shell elements of curvilinear shape leading to reduced mass insofar as it is not necessary to provide a liquid expulsion device.

According to the present invention, these objects are achieved by the tank of the invention which includes:

an outer first shell element having a curvilinear shape and including at one end a surface portion S of radius of curvature r which is concave on the liquid side;

an inner second shell element fixed to said first element, being convex in shape on a side that counts liquid, and regular in shape without any angular points or lines and including a surface portion S' having a part which is slightly inclined relative to the surface portion S in said privileged zone forming a narrowest zone between the surface portions S and S', the surface portion S' having a radius of curvature r' which is less than the radius of curvature r, at least in said narrowest zone wherein liquid is urged into the narrowest zone due to a capillary effect; and at least one liquid drawing-off element opening out into said narrowest zone lying between said surface portions S and S'.

The two shell elements may be of various different shapes providing that continuity of their surfaces is maintained, i.e. providing they present no angular points or lines. For example, these shell elements may be made spherical or ellipsoidal in shape.

The tank may also be generally toroidal in shape.

Insofar as the special shapes of the first and second elements of the shell define a liquid expulsion system without the need to add additional elements, the construction of the tank can be greatly simplified and its mass can be reduced. In addition, the tank of the invention may give rise to a significant saving in overall bulk, particularly when it is used with other tanks.

In order to enable more difficult missions to be undertaken, and particularly when the accelerations which tend to slow down liquid expulsion are large or when it is important to have large flow rates, it is advantageous, but not essential, for the tank presenting the special configuration of the present invention to further include a liquid expulsion device placed near the drawing-off element in said narrowest zone. A tank of the invention having a shell capillary effect and provided with a liquid expulsion device implements capillary forces at a density which is much greater than in most prior art tanks.

For example, the liquid expulsion device may be made from perforated sheets extending radially relative to the shells; however the device could also be constituted by perforated sheets extending substantially parallel to the surfaces of the tangential zone between the two shells.

The perforated sheets of the liquid expulsion device reinforce the effect of capillarity due to the shape of the tank, thereby providing a considerable improvement over tanks fitted with a liquid expulsion device but in which the shape of the tank itself does not contribute to confining the liquids.

Without going beyond the scope of the invention, the liquid expulsion device may comprise a combination of the two above-mentioned embodiments, i.e. it may be made from interfitting radial and circumferential perforated sheets extending along both above-mentioned perpendicular directions.

The spacing between the sheets may vary: with the spacing becoming smaller and smaller on approaching the liquid drawing-off point.

BRIEF DESCRIPTION OF THE DRAWINGS

Embodiments of the invention are described by way of example with reference to the accompanying drawings, in which:

FIGS. 2 to 4 and 5A and 5B are sections through various other shapes of tanks in accordance with the invention;

FIGS. 6A and 6B are sections on line VI—VI of FIG. 1 through a tank of the invention with the top half-section of FIG. 6A showing the tank fitted with a liquid expulsion device comprising equidistant radial sheets and with the bottom half-section of FIG. 6 showing radial sheets at varying spacing;

FIGS. 7A and 7B are a section view analogous to FIGS. 6A and 6B but the top half-section of FIG. 7A shows a tank provided with discontinuous circular sheets, while the bottom half-section of FIG. 7B shows a tank provided with continuous circular sheets;

FIGS. 8A and 8B are a section on line VIII—VIII of FIG. 3 which is analogous to the section of FIGS. 6A and 6B but with the top portion of FIG. 8A showing a combined device in which the radial sheets are equidistant and with the bottom portion of FIG. 8B showing a combined device in which the radial sheets are at variable spacing;

FIGS. 9A, 9B, and 9C are sections showing how the various compartments of a liquid expulsion device having non-equidistant radial sheets are filled;

FIG. 10A is a section showing how the various compartments of a liquid expulsion device having equidistant radial sheets are filled;

FIG. 10B is a section analogous to the top half-section of FIG. 6A showing the changes in the length of the compartments delimited by constant separation radial sheets;

FIGS. 11 and 12 are section views analogous to FIGS. 7A and 7B showing two different distributions of circular sheets and two different locations for the liquid take-off duct;

FIG. 13 is a section view analogous to that of FIGS. 7A and 7B but shows a special liquid take-off device;

FIG. 14 is a diagrammatic section view showing two tanks of the invention engaged one within the other; and FIG. 15 is a diagrammatic section view showing a conventional spherical tank engaged in a tank of the invention.

DETAILED DESCRIPTION

Figure 1:
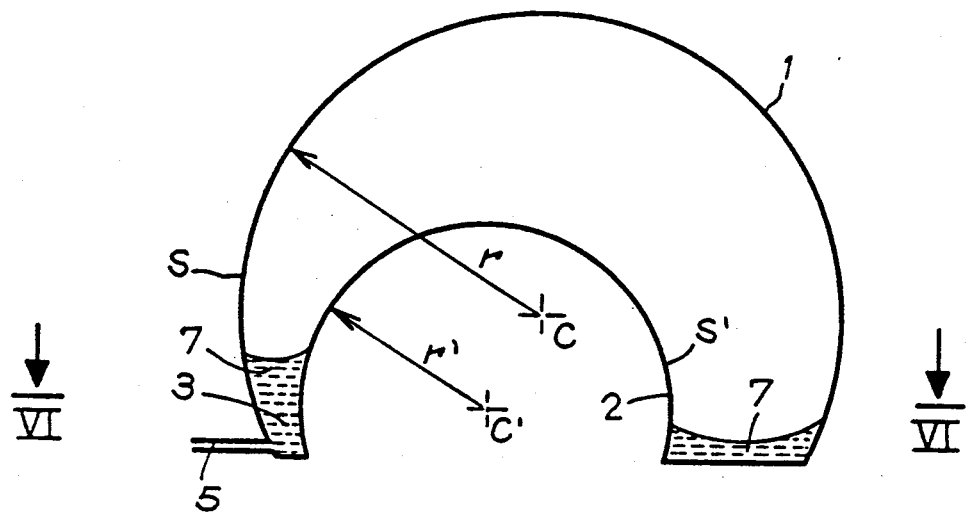
FIG. 1 is a section through a shell of a tank constituting a first embodiment of the invention.

Each of FIGS. 1 to 5 shows a tank constituted by two shell elements: a concave outer shell element 1 and an inner shell element 2 disposed inside the first element, which inner shell is convex on the inside of the tank. The two shell elements 1 and 2 are disposed in such a manner as to define a zone 3 between them wherein surfaces S and S' are gently converging, thereby confining the liquid contained inside the tank in said zone by a capillary effect, which may also be referred to as a corner effect. In this zone 3, the radius of curvature r' of the surface S' is less than the radius of curvature r of the surface S.

In addition, at least one drawing-off element 5 is provided for drawing-off the liquid confined in the zone 3. This element 5 is in the form of a duct which opens out into the narrowest portion of the zone 3 where the shells 1 and 2 are almost parallel.

FIG. 1 shows a first embodiment of the invention in which each of the shells 1 and 2 is spherical.

The radius r' of the inner sphere 2 is less than the radius r of the outer sphere. The centers C and C' of the two spheres do not coincide, thereby providing a quasi parallel zone in which the liquid will be confined under the effect of surface tension in the event of substantially zero acceleration.

Figure 2:
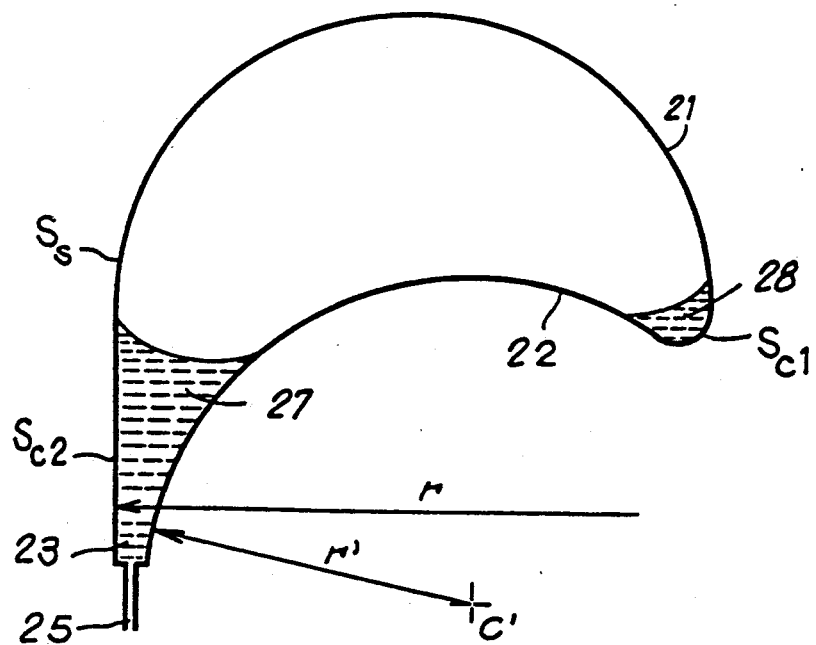

In a second embodiment of the invention, as shown in FIG. 2, the first shell element 21 is hemispherical in a first portion $S_s$ and it is extended at its two ends by a cylindrical surface $S_{c1}$, $S_{c2}$. The second shell element 22 has a spherical surface of radius r' and of center C'. One end of the spherical surface 22 connects with the bottom end of the shortest portion of the cylindrical surface $S_{c1}$ of the first shell element, whereas the other end of the inner sphere 22 is nearly parallel to the bottom end of the longer portion of the cylindrical surface $S_{c2}$ of the first shell element 21, thereby defining a zone 23 for confining the liquid 27. Naturally, the radius of curvature r of the first shell element 21 is infinite in this zone, so the above-mentioned characteristic relating to the radii r and r' remains true. Finally, a drawing-off element 25 is provided opening out into the narrowest portion of the zone between the first and second shell elements 21 and 22.

As can be seen in FIG. 2, the small cylindrical surface $S_{c1}$ is preferably connected to the inner shell 22 by a small rounded portion, thereby preventing an angular junction being formed in which a residual volume of liquid 25 could be lodged that would be difficult to draw off.

FIG. 3 shows an embodiment which differs from that of FIG. 2 only in the relative disposition of the shells and by the fact that the outer shell 31 is symmetrical about an axis XX'. The inner shell 32 is hemispherical but its center does not lie on the axis XX' of the first shell 31, thereby obtaining a quasi-parallel zone 33 (to the left of FIG. 3).

FIG. 4 differs from FIG. 2 only in the shape of the inner shell 42 which, in this embodiment, is ellipsoidal.

Finally, FIG. 5A shows a tank which is generally toroidal in shape with each of its half-sections being identical in shape to that shown in FIG. 2, for example. In this case, a plurality of drawing-off elements 55A are required in order to ensure improved drawing-off distribution around the entire toroidal tank. However, a single drawing-off duct 55' could be used if the tank is made from two toroidal surfaces having different axes as shown in the variant of FIG. 5B.

As in the FIG. 2 case, the tanks of FIGS. 4, 5A, and 5B preferably have a rounded internal connection portion between the inner shells 42, 52A, 52B and the outer shells 41, 51A, 51B in internal junction zones that do not co-operate with respective drawing-off elements 45, 55A, 55B.

Without going beyond the scope of the invention, a tank according to any of the above-described embodiments may be provided with a liquid expulsion device 64A, 64B, 74A, 74B, 84A, 84B as shown in FIGS. 6A, 6B, 7A, 7B, 8A, and 8B, respectively for example.

Two first forms of liquid expulsion device 64A, 64B are shown in FIGS. 6A and 6B.

The top half-section of FIG. 6A shows a liquid expulsion device in the form of regularly spaced apart perforated sheets 641A extending radially relative to the axis (or one of the axes) of symmetry of the first shell element 61A. These sheets are fixed between the two shell elements in the quasi parallel zone 63A where the liquid is confined, and they rise over a fraction only of the height of the tank. They therefore reinforce the effect of capillarity due to the shape of the tank, thereby providing a considerable improvement over tanks that are fitted with a liquid expulsion device but in which the shape of the tank itself does not contribute to confining liquids.

The bottom half-section of FIG. 6B shows an embodiment very close to the above embodiment since the only difference lies in the spacing between perforated sheets 64B, which is now variable instead of being constant. More precisely, the spacing between the sheets diminishes as the spacing between the first and second shells diminishes. In both the above cases, the drawing-off element 65A, 65B are each preferably fixed in the zone where the capillary effect is greatest, i.e. where the zone where the capillary effect is greatest, i.e. where the sheets are closest together.

Advantageously, the diameters of the holes in the radial sheets 641A, 641B become smaller on getting closer to the drawing-off element 65A, 65B.

FIGS. 9A, 9B, 9C, and 10A, 10B assist in understanding the operation of the two liquid expulsion devices described above.

At the end of its lifetime, i.e. when the mass of liquid 97A remaining in the tank is small, the liquid 97A no longer completely covers the compartments 961, 962, and 963 between the radial sheets 941, and in particular the compartment 961 in which the spacing between sheets is smallest, and as a result the compartment 961 is the first to empty. The emptying of this compartment must be monitored carefully since it is essential to avoid emptying the compartment 961 completely since otherwise the drawing-off duct 95 would extract gas. The level shown in FIG. 9A is the minimum acceptable level.

In the absence of gravity, the compartment 961 will fill first (FIG. 9B) by drawing liquid from the adjacent compartment 962 which will in turn draw liquid from the next compartment 963. This is due to the fact that the meniscus constituted by the compartment 961 has greater capillary power $\Delta p_1$ than the capillary power $\Delta p_2$ of the compartment 962 since the distance between the walls 941 is smaller and the local curvature of the meniscus is therefore greater. The same phenomenon occurs between the compartments 962 and 963, and so on until final equilibrium is reached as shown in FIG. 9C. The re-filling speed is related to the head losses of the liquid 97 where it passes through the holes 944 in the sheets 941.

FIGS. 10A and 10B serve to explain the phenomenon whereby the compartment 161 connected to the drawing-off duct 15 is refilled even when the sheets 141 are uniformly spaced apart. The applicable physical law is naturally the same in this case as in the preceding case except that in this case the greater capillary effect in the compartments 161 is due to the fact that the distances La, Lb, Lc, ... between shells 11 and 12 as measured radially decrease on approaching the drawing-off duct 15 via the compartments 164, 163, 162, and 161. The local curvature of the meniscus in the compartment 161 is therefore more highly curved than in the compartment 162 which is itself more highly curved than in the compartment 163, etc.

In another embodiment of the invention as shown in FIGS. 7A and 7B, the liquid expulsion device is constituted by "circumferential" perforated sheets 742A, 742B, i.e. sheets which extend substantially parallel to the shell elements in the zones 73A, 731B.

As can be seen from the top half-section of FIG. 7A, the perforated sheets 742A may be discontinuous. However they may also be continuous as shown in the bottom half-section of FIG. 7B. All of the sheets 742A, 742B are centered on different centers so that the inter-sheet or sheet-to-shell spacing diminishes on approaching the drawing-off duct 75B. This duct opens out into compartments 731B to 733B where the capillary force is greatest, i.e. into the compartment 731B, for example, which is shortest in the radial direction, thereby having maximum curvature and thus the preponderant capillary effect.

The drawing-off duct 125 may therefore open out at a point 253 close to the inner shell 122 (FIG. 12) or at a point 51 close to the outer shell 111(FIG. 11), depending on the design of the liquid expulsion device.

The same physical principles as explained for a liquid expulsion device having radial sheets applies in this case. Consequently, at the end of tank emptying, the compartment in which the drawing-off duct opens out is the compartment which empties first, but this is the compartment having the meniscus with the greatest capillary force. Naturally, when operating under acceleration due to the engines of the vehicle on which the tank is mounted, tank emptying must be stopped before the last compartment is completely emptied in order to avoid delivering gas. Under weightlessness, the greater capillary force will enable the corresponding compartment to refill progressively, i.e. it will enable the emptiest compartment to refill.

Without going beyond the scope of the invention, a liquid expulsion device is proposed which combines both of the above-described embodiments, i.e. which is constituted both by radial perforated sheets 841A, 841B (that are equidistant or at variable spacing, respectively) and by circumferential perforated sheets 842A, 842B. An embodiment is shown in FIGS. 8A and 8B in which the top portion FIG. 8A shows radial sheets 841A at constant spacing, and in which the bottom portion FIG. 8B shows sheets 841B that come closer and closer together on approaching the drawing-off duct 85B, with a perforated circumferential sheet 842B additionally being interposed between the shells 81B and 82B.

As shown by way of example in FIG. 3, an additional perforated sheet 343 may be placed locally above the grid constituted by the perforated sheets 341 and 342 so as to define a volume V which is connected to the drawing-off duct 35. The volume V acts as a buffer. In other words, this volume can be used for drawing off liquid, but it is then necessary to wait for it to be refilled in a phase of quasi-weightlessness before it can be used again.

Finally, when the liquid expulsion device is constituted by a plurality of compartments 1331, 1332, and 1333 and the drawing-off duct may be pierced by a plurality of calibrated holes 1351, 1352, 1353 opening out into respective ones of the compartments 1331, 1332, and 1333 (FIG. 13) or into some of the compartments 1331, 1332, and 1333. Advantageously, the largest diameter hole 53 opens out into the compartment 1353 from which drawing-off takes place initially, and conversely the smallest diameter hole 1351 opens out into the compartment 1331 from which drawing-off is to be performed last. The diameters of the orifices 1353, 1352, 1351 of the drawing-off duct 135 thus fall off in the order in which liquid is drawn from the various compartments 1333, 1332, and 1331.

FIGS. 14 and 15 show the reduction in the volume required for a set of two tanks including at least one that embodies the invention, i.e. a tank comprising a first shell element 141, 151 which is concave on the liquid side and a second shell element 142, 152 which is convex on the liquid side.

It is often necessary to place a plurality of liquid and gas containing tanks side by side, e.g. for a rocket engine using two liquid propellants, with different propellants being contained in two different tanks. Conventional tanks which are spherical in shape, for example, then lead to a large volume being occupied.

When using tanks of the present invention, and particularly when using tanks as shown in FIGS. 2, 4, 5A, and 5B, it is possible to obtain a compact disposition by interfitting two or more tanks one above the other.

FIG. 14 thus shows two tanks A and A' corresponding to the embodiment of FIG. 2. Tank A' is identical to tank A and includes components whose reference numbers are given a prime symbol, thus having an outer shell 141 whose concave side faces the fluid in the tank A', and which is received in the tank A beneath the inner shell 142 of tank A i.e. the shell whose convex surface faces the liquid in tank A. Similar compact dispositions may be obtained when using toroidal-shaped tanks, for example.

FIG. 15 shows a tank A of the invention having a drawing-off element 155 in association with a tank B having a drawing-off element 155'. In this case, the tank B is in the conventional spherical shape and it may be fitted with a conventional liquid expulsion device. The space saving is due to the fact that the spherical shell of the tank B may be received in the inner shell 152 of the tank A, i.e. in the shell whose convex face is directed towards the liquid contained in the tank A.

I claim:

1. A liquid and gas tank for operation, in particular, in satellites subject to low acceleration, and making use of the separation force produced by surface tension to collect liquid in a privileged zone of the tank without allowing gas to escape via said privileged zone, wherein the tank comprises:
   an outer first shell element of curvilinear shape and having a liquid side and an external side, said outer first shell element including at one end a surface portion S of radius of curvature r which is concave on said liquid side;
   an inner second shell element, fixed to said outer first shell element, and of curvilinear shape, and having a liquid side and an external side, being convex on the liquid side, and including a surface portion S' having a part which is slightly inclined relative to the surface portion S in said privileged zone forming a narrowest zone between the surface portions S and S', the surface portion S' having a radius of curvature r' which is less than the radius of curvature r, at least in said narrowest zone such that liquid is confined by a capillary effect in said narrowest zone between said first and second shell elements; and
   at least one drawing-off element opening out into said narrowest zone lying between said surface portions S and S'.

2. A tank according to claim 1, wherein said second shell element is generally hemispherical in shape.

3. A tank according to claim 1, wherein said second shell element is generally ellipsoidal in shape.

4. A tank according to claim 1, wherein the tank is generally toroidal in shape.

5. A tank according to claim 1, further including a liquid expulsion device placed in the vicinity of said drawing-off element.

6. A tank according to claim 5, wherein said liquid expulsion device includes a plurality of perforated sheets extending radially.

7. A tank according to claim 6, wherein said sheets include holes with diameters that are smaller in the vicinity of the drawing-off element than away from the drawing-off element.

8. A tank according to claim 6, wherein said plurality of radial sheets are equidistant from one another.

9. A tank according to claim 6, wherein said radial sheets are progressively closer approaching the drawing-off element.

10. A tank according to claim 9, wherein the drawing-off element, placed in said narrowest zone where the capillary effect is predominant, is in fluid communication with a compartment defined by at least one of a radial and circumferential perforated sheet, and by at least one of the surface portions S and S', in which capillary force is at a maximum.

11. A tank according to claim 5, wherein said liquid expulsion device includes at least one circumferential perforated sheet disposed substantially equidistant from both said surface portions S and S' within said privileged zone.

12. A tank according to claim 11, wherein each circumferential sheet is a single sheet.

13. A tank according to claim 11, wherein each circumferential sheet includes a plurality of parts.

14. A tank according to claim 11, wherein said circumferential sheets are disposed in such a manner that the sheets in said privileged zone become progressively closer approaching the drawing-off element.

15. A tank according to claim 11, wherein said liquid expulsion device includes a plurality of perforated sheets extending radially across said circumferential perforated sheet to form a grid, and wherein an additional perforated sheet is placed at the edge of the grid to define a buffer volume in fluid communication with the drawing-off element.

16. A tank according to claim 11, wherein the drawing-off element is provided with a plurality of calibrated orifices of different diameters from one another, and in fluid communication with respective different compartments delimited by said circumferential sheets, wherein a largest diameter hole is in fluid communication with a compartment from which liquid drawing-off occurs initially, and a smallest diameter hole is in fluid communication with a compartment from which liquid drawing-off occurs finally.

17. A set of tanks according to claim 1, wherein the measures of the set of tanks fit within one another, with the outer first shell element of one of the tanks being disposed near the inner second shell element of another of the tanks.

* * * * *

UNITED STATES PATENT AND TRADEMARK OFFICE
CERTIFICATE OF CORRECTION

PATENT NO. : 5,111,856

DATED : May 12, 1992

INVENTOR(S) : Denis L. Baralle

It is certified that error appears in the above-identified patent and that said Letters Patent is hereby corrected as shown below:

Column 4, line 33, "liquid 25" should be --liquid 28--

Column 5, line 14, "64B" should be --641B--

Column 6, line 19, "253" should be --1253--

Signed and Sealed this

Twenty-third Day of November, 1993

Attest:

BRUCE LEHMAN

Attesting Officer        Commissioner of Patents and Trademarks